United States Patent
Oikawa (10) Patent No.: US 12,251,835 B2
(45) Date of Patent: Mar. 18, 2025

(54) TOOL DRIVE DEVICE AND ROBOT

(71) Applicant: FANUC CORPORATION, Yamanashi (JP)

(72) Inventor: Akihiro Oikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/548,264

(22) PCT Filed: Apr. 7, 2021

(86) PCT No.: PCT/JP2021/014777
§ 371 (c)(1),
(2) Date: Aug. 29, 2023

(87) PCT Pub. No.: WO2022/215197
PCT Pub. Date: Oct. 13, 2022

(65) Prior Publication Data
US 2024/0131693 A1 Apr. 25, 2024
US 2024/0227172 A9 Jul. 11, 2024

(51) Int. Cl.
*B25J 9/12* (2006.01)

(52) U.S. Cl.
CPC .................... *B25J 9/126* (2013.01)

(58) Field of Classification Search
CPC .. B25J 9/0009; B25J 19/0025; B25J 19/0029; B25J 17/02; B25J 17/025; B25J 18/007
USPC .................................................. 901/27–29
See application file for complete search history.

(56) References Cited

U.S. PATENT DOCUMENTS

| 7,513,174 B2 * | 4/2009 | Harada | B25J 17/0283 |
| | | | 901/29 |
| 8,869,644 B2 * | 10/2014 | Amparore | B25J 17/0283 |
| | | | 901/29 |
| 2017/0072573 A1 * | 3/2017 | Motokado | B25J 17/0283 |
| 2019/0077012 A1 * | 3/2019 | Inoue | B23K 26/0884 |
| 2020/0338718 A1 * | 10/2020 | Oowaki | B25J 9/0009 |

FOREIGN PATENT DOCUMENTS

| CN | 107972064 A | * | 5/2018 | |
| CN | 112454328 A | * | 3/2021 | ............ B25J 18/00 |
| JP | S58164656 U | | 11/1983 | |
| JP | H06008182 A | | 1/1994 | |
| JP | 2002035913 A | | 2/2002 | |

(Continued)

*Primary Examiner* — Bobby Rushing, Jr.
(74) *Attorney, Agent, or Firm* — Maier & Maier, PLLC (57) ABSTRACT

A tool drive device including a motor, a movable part driven by the motor to move a tool, and a bracket used to attach the motor and the movable part to a flange at a wrist tip of a robot. The bracket includes a plate-like first attachment part that is attached to the flange and a plate-like second attachment part to which the motor and the movable part are attached. The movable part is disposed on the opposite side from the flange with the first attachment part therebetween in the plate thickness direction thereof and on the opposite side from the motor with the second attachment part therebetween in the plate thickness direction thereof. The first attachment part is provided with a wiring-body passage that guides a wiring body that has been wired through a hollow hole in the flange, to the motor without being exposed toward the movable part.

6 Claims, 6 Drawing Sheets

(56) References Cited

FOREIGN PATENT DOCUMENTS

| JP | 2016215371 A | 12/2016 |
|----|--------------|---------|
| JP | 6441255 B | 12/2018 |
| JP | 2018192607 A | 12/2018 |
| JP | 6572270 B | 9/2019 |
| JP | 2020116681 A | 8/2020 |

* cited by examiner

FIG. 6

TOOL DRIVE DEVICE AND ROBOT

TECHNICAL FIELD

The present disclosure relates to a tool drive device and a robot.

BACKGROUND

There is a known robot in which a control wiring body is wired from the rear side of a second arm to a tool attached to the distal end of a third wrist element through hollow holes provided in the second arm, a first wrist element, a second wrist element, and the third wrist element (for example, see Publication of Japanese Patent No. 6572270). The tool is fixed to the third wrist element by means of a plate-like bracket that is in close contact with a distal end surface of the third wrist element, and the control wiring body that has passed through the hollow hole in the third wrist element penetrates the bracket in the plate thickness direction and is wired to the tool.

SUMMARY

An aspect of the present disclosure is a tool drive device including: a motor; a movable part that is driven by the motor to move a tool; and a bracket that is used to attach the motor and the movable part to a flange at a wrist tip of a robot, wherein the bracket includes a plate-like first attachment part that is attached to the flange and a plate-like second attachment part to which the motor and the movable part are attached, the movable part is disposed on an opposite side from the flange with the first attachment part sandwiched therebetween in a plate thickness direction thereof and on an opposite side from the motor with the second attachment part sandwiched therebetween in a plate thickness direction thereof, and the first attachment part is provided with a wiring-body passage that guides a wiring body that has been wired through a hollow hole in the flange, to the motor without being exposed toward the movable part.

DETAILED DESCRIPTION OF EMBODIMENTS

A tool drive device 1 and a robot 100 according to an embodiment of the present disclosure will be described below with reference to the drawings.

The robot 100 according to this embodiment includes: a robot body 110; and the tool drive device 1 according to this embodiment, which is installed in the robot body 110.

Figure 1:
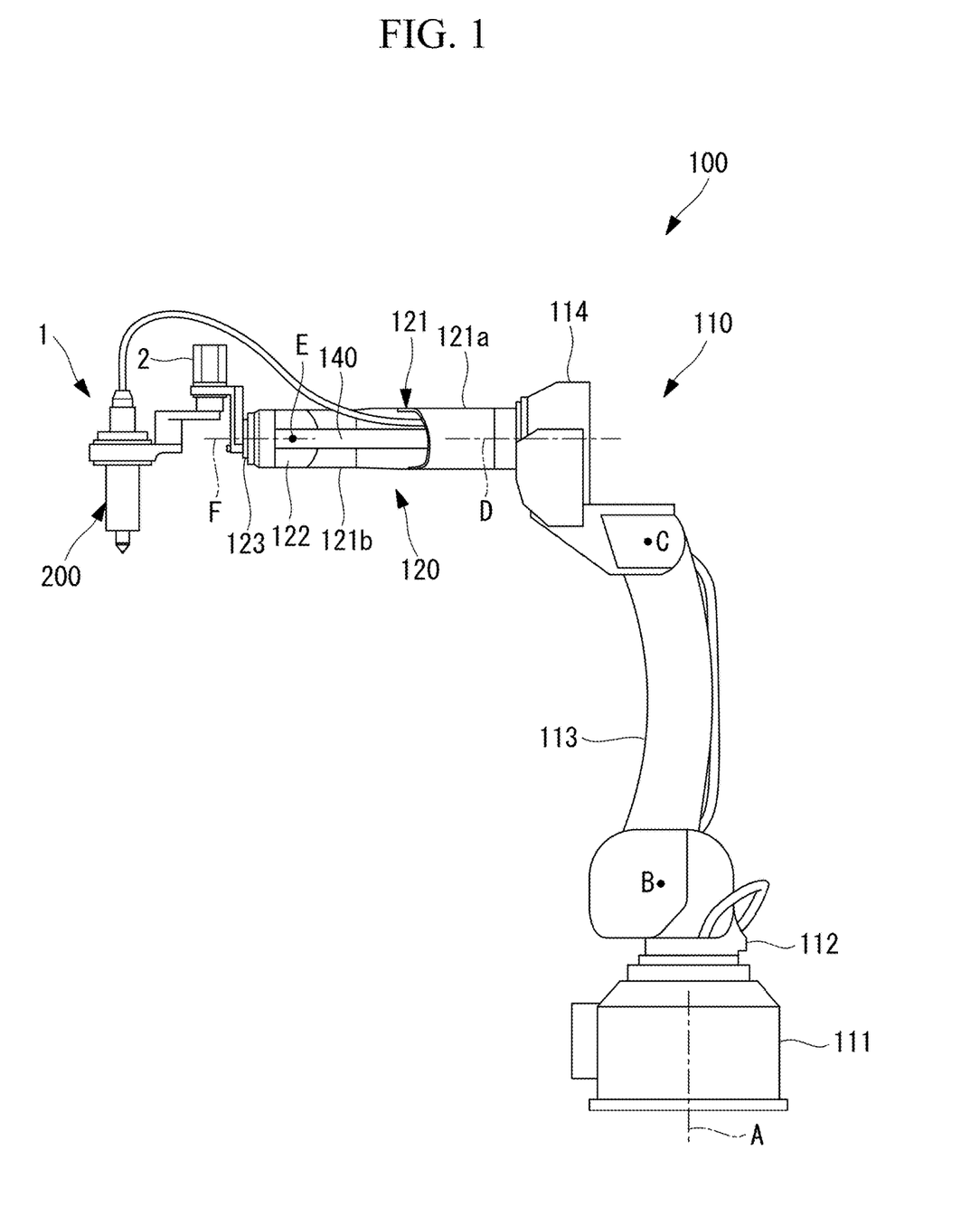
FIG. 1 is a side view showing a robot according to an embodiment of the present disclosure.

The robot body 110 is, for example, a six-axis articulated robot and, as shown in FIG. 1, includes a base 111 that is installed on a floor, and a revolving drum 112 that is supported so as to be rotatable about a vertical first axis A with respect to the base 111. In addition, the robot body 110 includes a first arm 113 that is supported so as to be rotatable about a horizontal second axis B with respect to the revolving drum 112, and a second arm 114 that is supported so as to be rotatable about a third axis C parallel to the second axis B with respect to the first arm 113. The revolving drum 112 is provided with a hole extending in a direction along the first axis A.

A three-axis wrist unit (wrist) 120 is attached to the distal end of the second arm 114. The wrist unit 120 includes: a first wrist element 121 that is supported so as to be rotatable about a fourth axis D, which extends along a plane orthogonal to the third axis C, with respect to the second arm 114; and a second wrist element 122 that is supported so as to be rotatable about a fifth axis E orthogonal to the fourth axis D with respect to the first wrist element 121. In addition, the wrist unit 120 includes a third wrist element 123 that is supported so as to be rotatable about a sixth axis F, which is orthogonal to the fifth axis E and intersects the fourth axis D and the fifth axis E at one point, with respect to the second wrist element 122.

The second arm 114 and the first wrist element 121 are provided with a hollow hole extending along the fourth axis D. The first wrist element 121 is provided with a cylindrical hollow portion 121a in which the hollow hole is provided, and an extension portion 121b extending parallel to the fourth axis D from the distal end of the hollow portion 121a.

Figure 2:
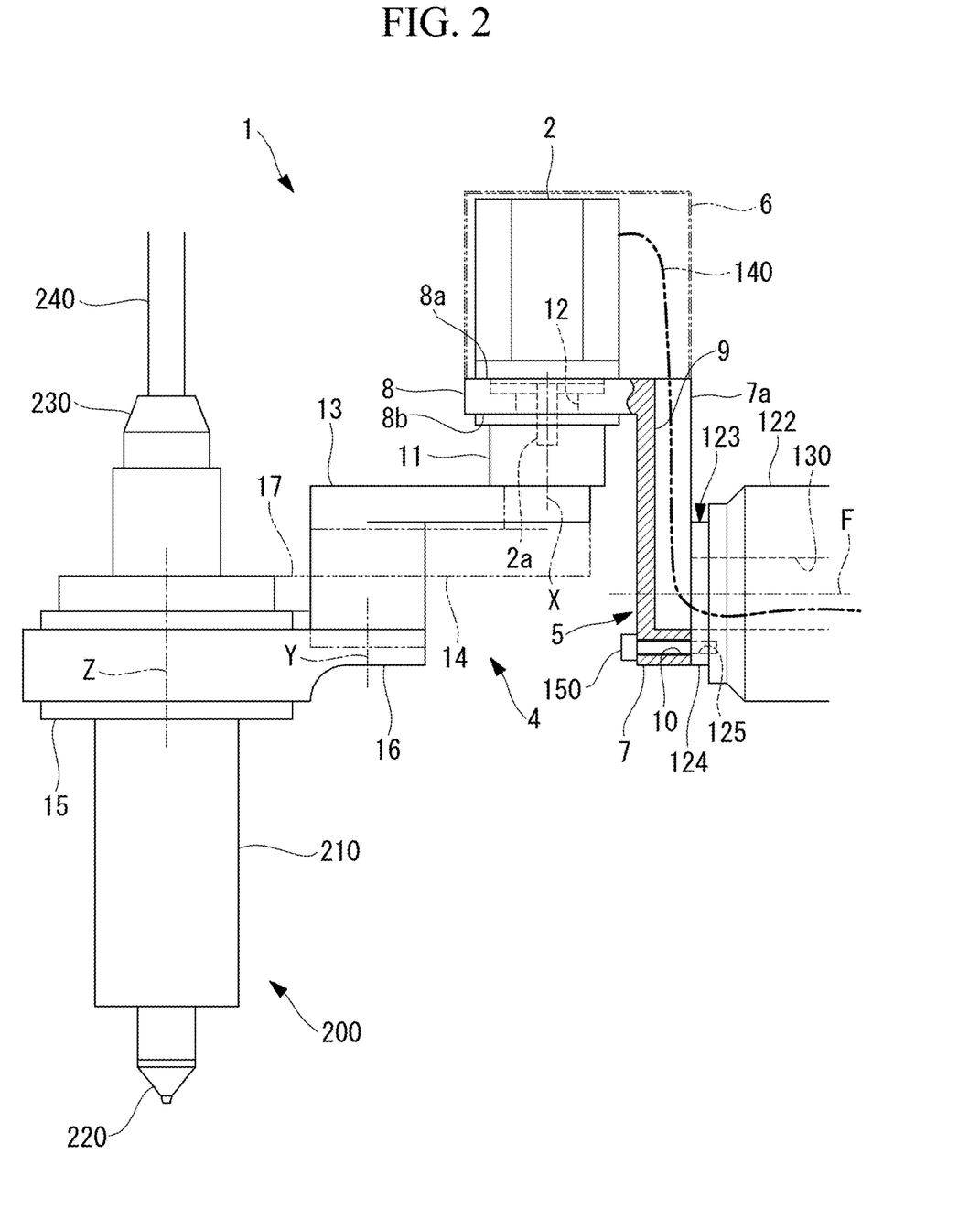
FIG. 2 is a partially cutaway side view showing a tool drive device according to an embodiment of the present invention, which is provided in the robot in FIG. 1.

The second wrist element 122 is attached to the distal end of the extension portion 121b so as to be rotatable about the fifth axis E. The second wrist element 122 and the third wrist element 123 are provided with a hollow hole 130 extending along the sixth axis F. As shown in FIG. 2, the third wrist element 123 includes an annular flange 124 provided with a plurality of screw holes 125 that are formed around the hollow hole 130 so as to be spaced apart in the circumferential direction.

The tool drive device 1 according to this embodiment is a device for supporting a tool 200 and moving the tool 200 with respect to the third wrist element 123. In this embodiment, the tool drive device 1 moves the tool 200 in a two-dimensional direction along a plane including the fifth axis E and the sixth axis F.

Figure 3:
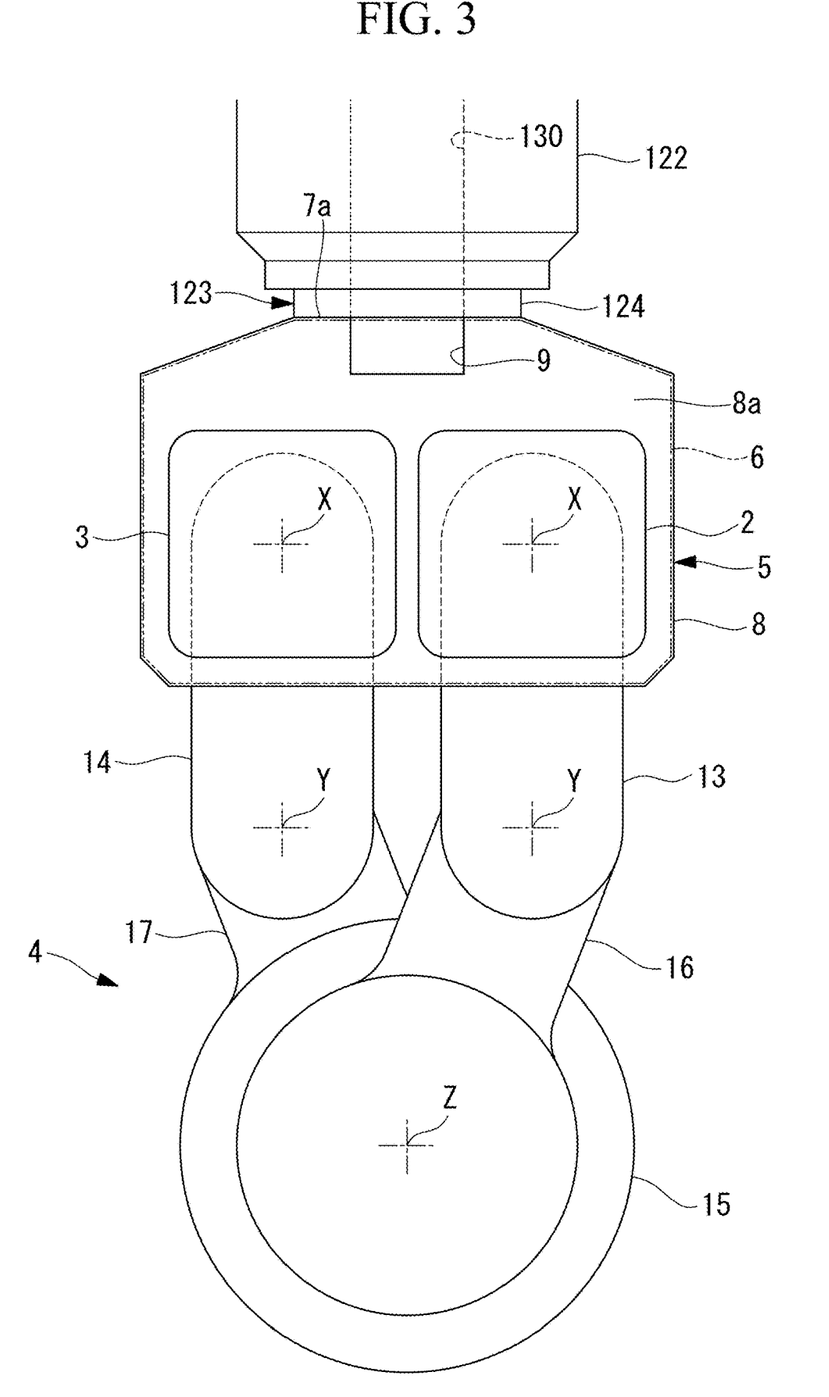
FIG. 3 is a plan view showing the tool drive device in FIG. 2.

As shown in FIGS. 2 and 3, the tool drive device 1 includes: two motors 2, 3; a drive mechanism (movable part) 4 that is driven by means of the driving forces of the individual motors 2, 3; a bracket 5 that is used to attach the motors 2, 3 and the drive mechanism 4 to the flange 124; and a motor cover (cover) 6 that covers the motors 2, 3.

The bracket 5 is formed in a substantially L-shape in which a flat plate-like first attachment part 7 and a flat plate-like second attachment part 8 are orthogonally arranged.

The first attachment part 7 has a flange attachment surface (first surface) 7a that is in close contact with the flange 124. The flange attachment surface 7a is provided with a groove (wiring-body passage) 9 that extends straight along the flange attachment surface 7a from a position corresponding to the hollow hole 130 provided in the flange 124, with which the flange attachment surface 7a is in close contact, to a motor attachment surface (second surface) 8a of the second attachment part 8. The groove 9 does not penetrate the first attachment part 7 in the plate thickness direction and has groove width and depth dimensions such that the groove 9 can accommodate a wiring body 140 that has passed through the hollow hole 130 in the flange 124.

In addition, the first attachment part 7 is provided with, at positions not overlapping the groove 9, a plurality of through-holes 10 through which bolts 150 pass, the bolts 150 being fastened into the screw holes 125 in the flange 124. By fastening the bolts 150 passing through the through-holes 10 into the screw holes 125 in the flange 124, the hollow hole 130 in the flange 124 is aligned with an end portion of the groove 9, and thus, it is possible to fix the flange 124 to the flange attachment surface 7a in a close contact state.

The second attachment part 8 is a portion to which the motors 2, 3 and the drive mechanism 4 are attached and has, on both sides of the second attachment part 8 in the plate thickness direction thereof, a motor attachment surface 8a to which the motors 2, 3 are attached and a reducer attachment surface 8b to which reducers 11 are attached. The motor attachment surface 8a is provided with a plurality of screw holes into which bolts for attaching the motors 2, 3 are fastened.

As shown in FIGS. 2 and 3, the motor cover 6 is formed in a box shape covering the entirety of the two motors 2, 3 attached to the motor attachment surface 8a, and is fixed to the motor attachment surface 8a by means of bolts or the like (not shown).

The second attachment part 8 is provided with, at positions where the two motors are attached, through-holes 12 through which shafts 2a of the motors 2, 3 pass in the plate thickness direction. The reducer attachment surface 8b is provided with a plurality of screw holes into which bolts for attaching the reducers 11 are fastened.

As shown in FIG. 2, the drive mechanism 4 includes the two reducers 11 that are attached to the reducer attachment surface 8b, and two arms 13, 14 that are fixed to output shafts of the respective reducers 11. In addition, the drive mechanism 4 includes a tool attachment part 15 to which the tool 200 is attached, and two links 16, 17 that connect the tool attachment part 15 and the two arms 13, 14.

The shafts 2a of the two motors 2, 3 attached to the motor attachment surface 8a pass through the through-holes 12 in the second attachment part 8 to be inserted into the corresponding reducers 11, thereby inputting the driving forces of the motors 2, 3 to the reducers 11. The respective reducers 11 decelerate the rotations of the shafts 2a of the respective motors 2, 3 and transmit the rotations to the arms 13, 14. As a result, the two arms 13, 14 are individually rotationally driven about parallel axes X of the two reducers 11.

Figure 4:
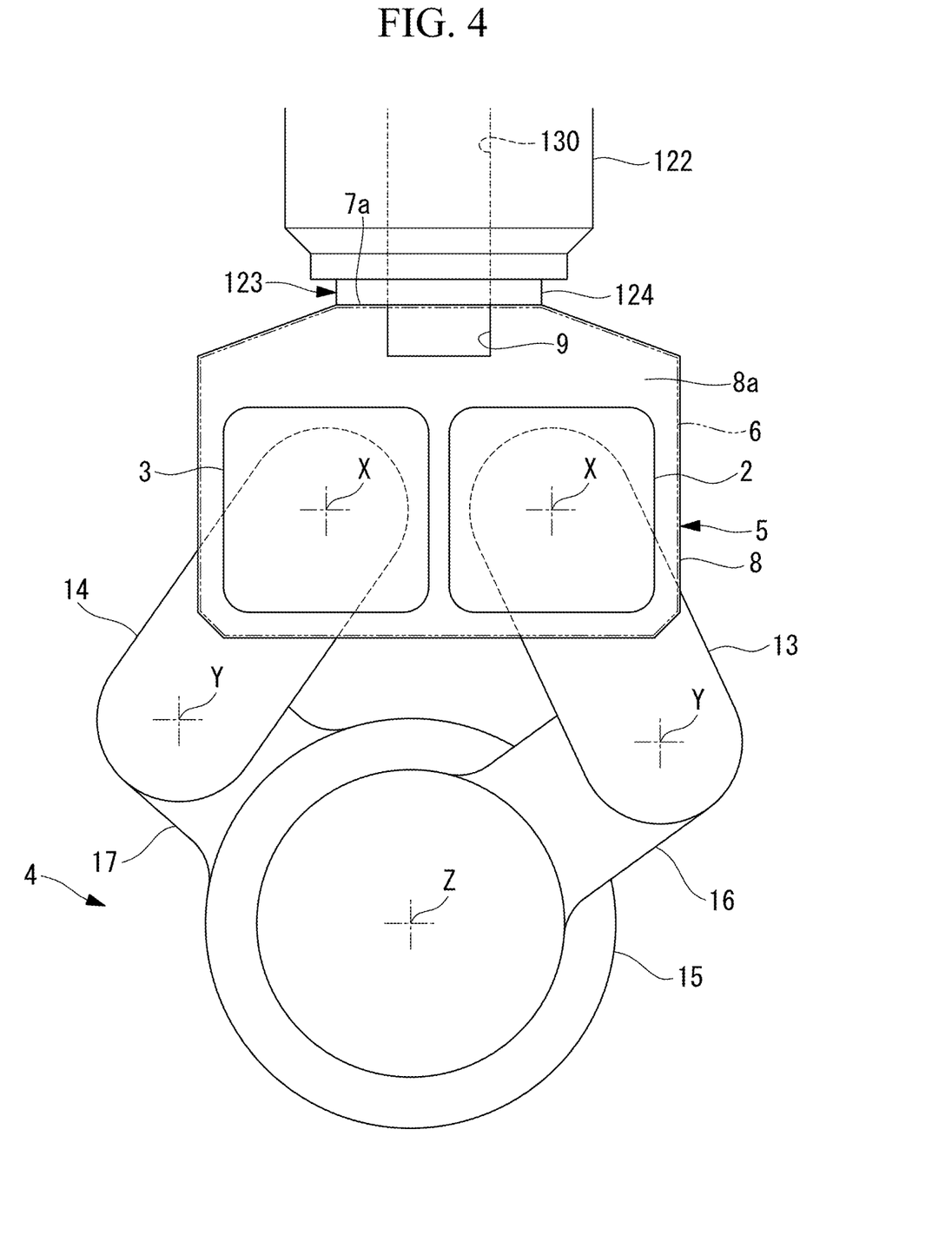
FIG. 4 is a plan view showing an example of a posture in which arms and links of the tool drive device in FIG. 2 are driven.

As shown in FIGS. 3 and 4, the two arms 13, 14 and the two links 16, 17 are connected to each other so as to be rotatable about axes Y parallel to the axes X. In addition, the links 16, 17 are connected to each other so as to be rotatable about an axis Z of the tool attachment part 15, which is parallel to the axes Y.

As shown in FIGS. 2 and 3, when the two arms 13, 14 are arranged at respective angular positions in a state in which the robot body 110 is stopped, the tool attachment part 15 is disposed at a position uniquely determined due to the angles of the two arms 13, 14. The tool 200 is, for example, as shown in FIG. 2, a laser processing tool. The laser processing tool 200 includes: a tool body 210; a nozzle 220 disposed at the distal end of the tool body 210; and a connecting portion 230 that connects an optical fiber 240 to the base end of the tool body 210.

The laser processing tool 200 is attached to the tool attachment part 15 such that an axis of the nozzle 220 is arranged in a direction orthogonal to the plane including the fifth axis E and the sixth axis F. When the position of the tool attachment part 15 is moved as a result of actuating the drive mechanism 4, the position of the nozzle 220 of the laser processing tool 200 is moved in a direction orthogonal to the axis of the nozzle 220, and thus, it is possible to two-dimensionally change the laser processing position.

The operation of the thus-configured tool drive device 1 and robot 100 according to this embodiment will be described below.

The tool drive device 1 is attached to the robot body 110 by bringing the flange attachment surface 7a of the first attachment part 7 of the bracket 5 into close contact with a distal end surface of the flange 124 of the robot body 110, and by fastening the bolts 150 passing through the through-holes 10 in the first attachment part 7 into the screw holes 125 in the flange 124.

In this case, in the robot body 110, the control wiring body 140 is wired from the rear side of the second arm 114, passes through the hollow hole in the second arm 114 and the first wrist element 121, passes through the hollow hole 130 in the second wrist element 122 and the third wrist element 123, and is led out from the distal end surface of the flange 124. Because the groove (wiring-body passage) 9 is provided in the flange attachment surface 7a of the first attachment part 7, the wiring body 140 that has been led out forward from the distal end surface of the flange 124 is led out from the motor attachment surface 8a of the second attachment part 8 through the groove 9, and is connected to the motors 2, 3.

The groove 9 does not penetrate the first attachment part 7 in the plate thickness direction, and when viewed from the side of the laser processing tool 200 attached to the tool attachment part 15, the wiring body 140 remains always hidden on the back surface side of the first attachment part 7. In addition, the portion of the wiring body 140, which is led out from the motor attachment surface 8a of the second attachment part 8 and is connected to the motors 2, 3, is covered by the motor cover 6 and thus is protected more reliably. Therefore, there is an advantage in that, even when spatter or the like is scattered due to laser processing, the scattered spatter or the like does not adhere to the wiring body 140, and thus, it is possible to prevent a reduction in the durability of the wiring body 140.

Because the wiring body 140 that has been led out from the distal end surface of the flange 124 is accommodated in the groove 9, it is possible to bring the distal end surface of the flange 124 into close contact with the flange attachment surface 7a on the periphery of the groove 9, thereby firmly fixing the tool drive device 1 to the robot body 110. The optical fiber 240 to be connected to the laser processing tool 200 passes through the hollow hole in the first wrist element 121 and is subsequently connected to the connecting portion 230 of the laser processing tool 200 from outside the wrist unit 120 without passing through the hollow hole 130 in the second wrist element 122 and the third wrist element 123. Because the optical fiber 240 is not included in the wiring body 140 that passes through the hollow hole 130 and the groove 9, it is possible to prevent bending of the optical fiber 240.

In addition, with the tool drive device 1 attached to the distal end of the wrist unit 120 of the robot body 110, it is desirable to reduce the load on the wrist unit 120 of the robot 100.

In order to solve this problem, the tool drive device 1 according to this embodiment has the following configuration.

Specifically, the tool drive device 1 includes the motors 2, 3, the movable part 4 that is driven by the motors 2, 3 to move the tool 200, and the bracket 5 that is used to attach the motors 2, 3 and the movable part 4 to the flange 124 at the distal end of the wrist unit 120 of the robot 100. The bracket 5 includes the plate-like first attachment part 7 that is attached to the flange 124 and the plate-like second attachment part 8 to which the motors 2, 3 and the movable part 4 are attached. The movable part 4 is disposed on the opposite side from the flange 124 with the first attachment part 7 sandwiched therebetween in the plate thickness direction thereof and on the opposite side from the motors 2, 3 with the second attachment part 8 sandwiched therebetween in the plate thickness direction thereof. The tool 200 is disposed on the opposite side from the motors 2, 3 with a central axis of the flange 124 sandwiched therebetween.

With the tool drive device 1 and the robot 100 according to this embodiment, the two motors 2, 3 are fixed to the motor attachment surface 8a of the second attachment part 8 of the L-shaped bracket 5. In addition, the two reducers 11 that respectively decelerate the rotations of the two motors 2, 3 are also fixed to the reducer attachment surface 8b of the second attachment part 8 of the L-shaped bracket 5.

The motors 2, 3 and the reducers 11 are arranged on one side with respect to the plane including the fifth axis E and the sixth axis F.

In addition, the two arms 13, 14 and the two links 16, 17 that are rotationally driven by the two reducers 11 are rotated at a position relatively close to the plane including the fifth axis E and the sixth axis F, in a direction along the plane.

Furthermore, the tool body 210 of the laser processing tool 200 attached to the tool attachment part 15 is disposed on the opposite side from the motors 2, 3 and the reducers 11 with the plane including the fifth axis E and the sixth axis F sandwiched therebetween.

The motors 2, 3 and the reducers 11, the arms 13, 14 and the links 16, 17, and the tool body 210 have relatively large weights.

Therefore, with this embodiment, the total center of gravity of the arms 13, 14 and the links 16, 17 is located at a position relatively close to the plane including the fifth axis E and the sixth axis F. In addition, because the motors 2, 3 and the reducers 11 are disposed on the opposite side from the tool body 210 with the plane including the fifth axis E and the sixth axis F sandwiched therebetween, it is also possible to locate the total center of gravity of the motors 2, 3, the reducers 11, and the tool body 210 at a position relatively close to the plane including the fifth axis E and the sixth axis F.

As a result, the weight distribution around the sixth axis F is balanced, and thus, it is possible to reduce the load on the third wrist element 123 during acceleration/deceleration of the third wrist element 123 that is rotationally driven about the sixth axis F. In addition, because the two arms 13, 14 and the two links 16, 17 that are driven with relatively large acceleration/deceleration are arranged in the vicinity of the plane including the fifth axis E and the sixth axis F, when the components are driven, it is possible to suppress reaction forces acting on the first wrist element 121, the second wrist element 122, and the third wrist element 123.

Note that, although the two-axis device that drives the two arms 13, 14 by means of the two motors 2, 3 has been illustrated as an example of the tool drive device 1 in this embodiment, the device is not limited thereto, and a device having one or more axes may be employed.

In addition, although the tool drive device 1 that rotationally drives the arms 13, 14 by means of the motors 2, 3 has been illustrated as an example in this embodiment, a tool drive device that linearly moves the tool 200 may be employed.

Figure 5:
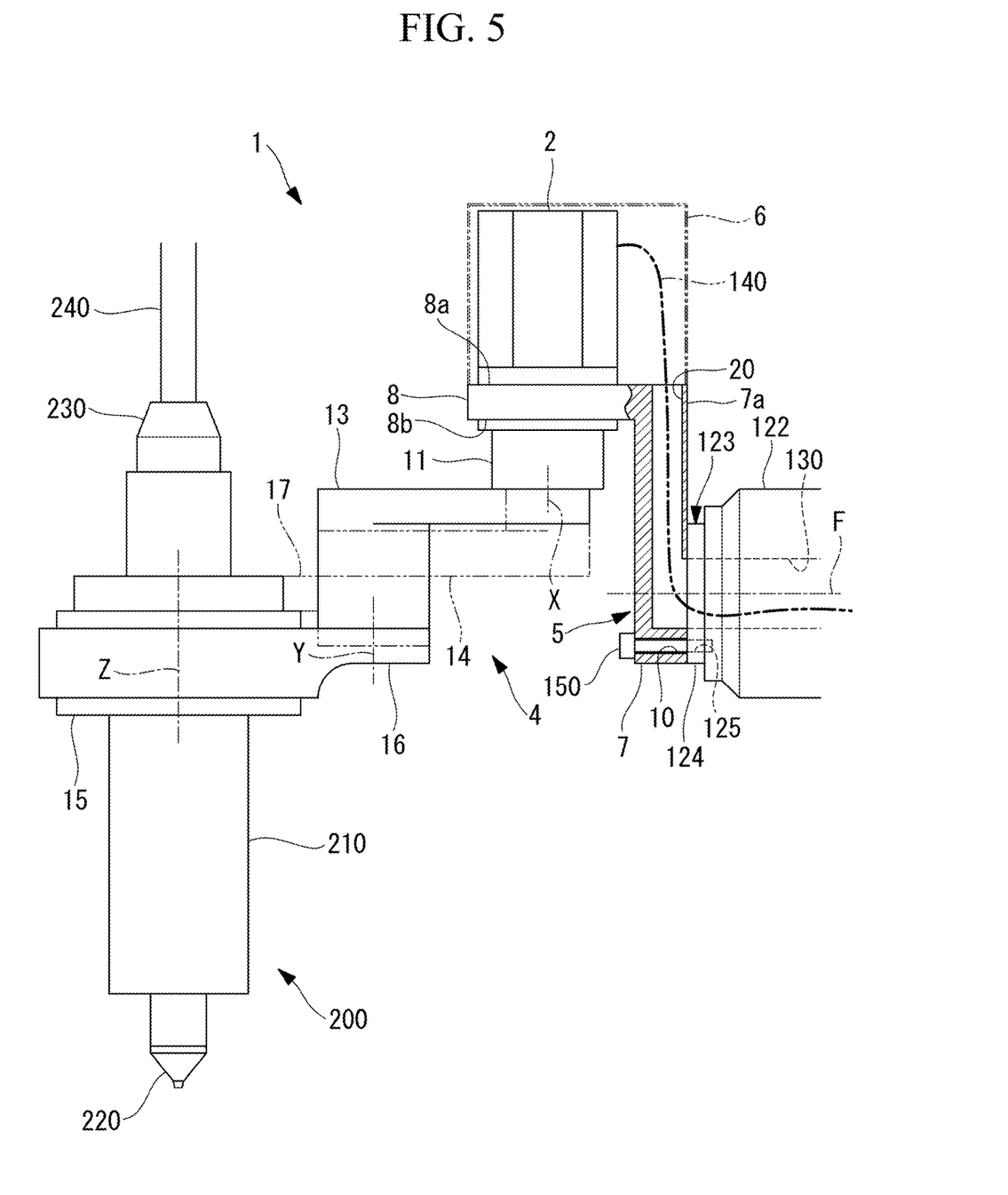
FIG. 5 is a partially cutaway side view showing a modification of the tool drive device in FIG. 2.
Figure 6:
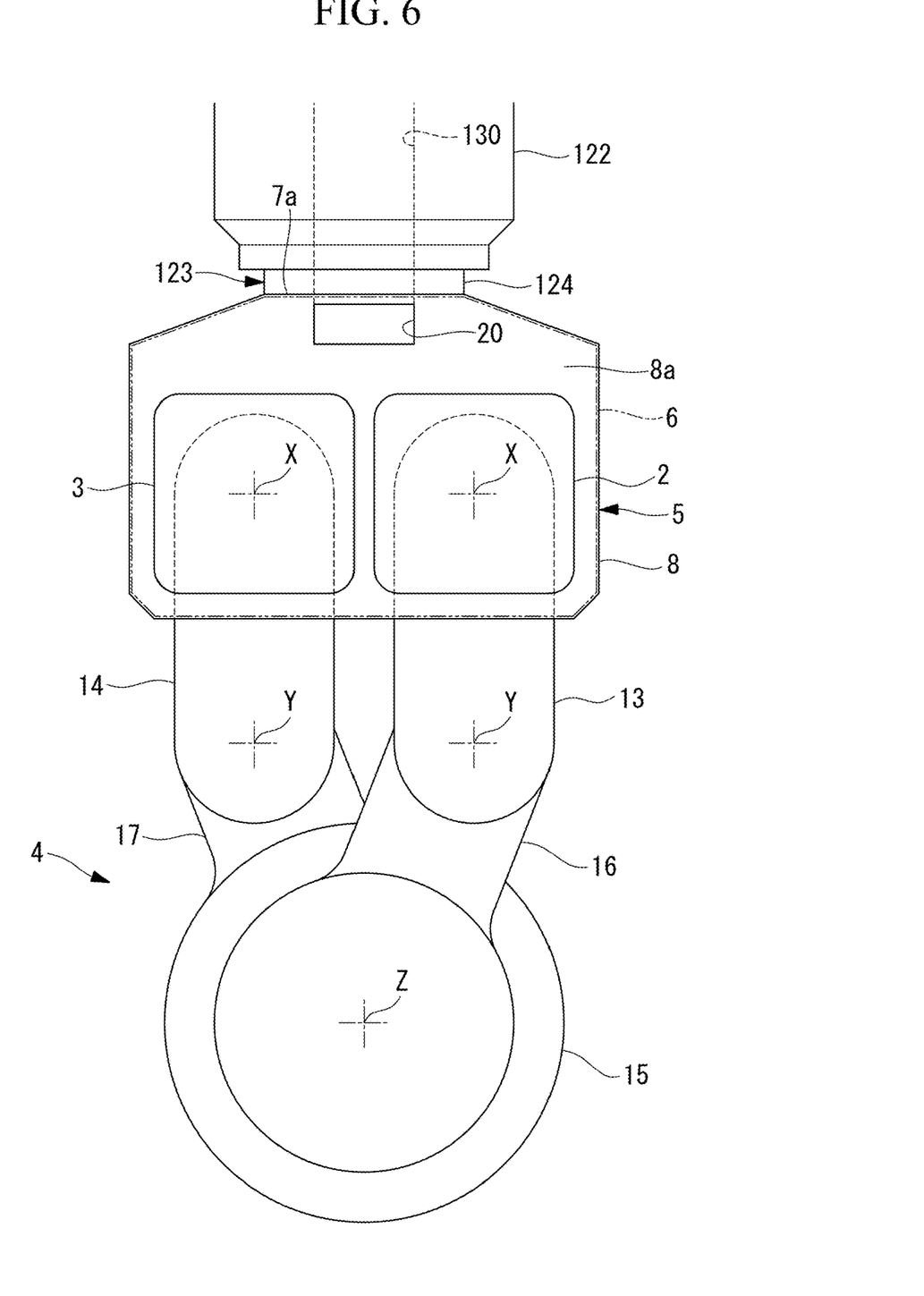
FIG. 6 is a plan view showing the tool drive device in FIG. 5.

In addition, although the groove 9 provided in the flange attachment surface 7a has been illustrated as an example of the wiring-body passage in this embodiment, alternatively, as shown in FIGS. 5 and 6, it is permissible to employ a hole-shaped passage (through-hole) 20 that opens at two locations, namely, in the motor attachment surface 8a and in the flange attachment surface 7a, at a position corresponding to the hollow hole 130 in the flange 124, and that extends along the first attachment part 7. By employing the passage 20 having a cross-sectional shape that allows passage of a connector provided at an end portion of the wiring body 140, it is possible to guide the wiring body 140 into the motor cover 6 without being exposed even to the back surface side of the first attachment part 7. In addition, by closing the opening on the flange attachment surface 7a side with the flange 124, it is also possible to prevent entry of dust into the motor cover 6.

In addition, although the laser processing tool 200 has been illustrated as an example of the tool, alternatively, any other tool may be mounted.

In addition, although the vertical six-axis articulated robot has been illustrated as an example of the robot body 110, the robot is not limited thereto, and any other type of robot may be employed.

The invention claimed is:

1. A tool drive device, comprising:
a motor;
a movable part that is driven by the motor to move a tool; and
a bracket that includes a plate-like first attachment part attached to a flange at a wrist tip of a robot and a plate-like second attachment part to which the motor and the movable part are attached, the first attachment part extending in a predetermined direction, and the second attachment part extending in a direction orthogonal to the predetermined direction,
wherein the movable part is disposed on an opposite side from the flange with the first attachment part sandwiched therebetween in a plate thickness direction thereof and on an opposite side from the motor with the second attachment part sandwiched therebetween in a plate thickness direction thereof,
the first attachment part is provided with a wiring-body passage configured to accommodate a wiring body that has been wired through a hollow hole in the flange, and
the wiring-body passage is provided along the predetermined direction so that the wiring body is guided to the motor without being exposed toward the movable part.

2. The tool drive device according to claim 1, wherein:
a first surface of the first attachment part with which the flange is in close contact and a second surface of the second attachment part to which the motor is fixed are arranged adjacent to each other, the first surface extending in the predetermined direction, and the second surface extending in the direction orthogonal to the predetermined direction; and
the wiring-body passage is a groove that is formed along the first surface from a position corresponding to the hollow hole in the flange, which is in close contact with the first surface, to the second surface.

3. The tool drive device according to claim 1, wherein:
a first surface of the first attachment part with which the flange is in close contact and a second surface of the second attachment part to which the motor is fixed are arranged adjacent to each other, the first surface extending in the predetermined direction, and the second surface extending in the direction orthogonal to the predetermined direction; and the wiring-body passage is a through-hole that opens at a position corresponding to the hollow hole in the flange, which is in close contact with the first surface, and in the second surface, and that penetrates through an interior of the first attachment part.

4. The tool drive device according to claim 2, further comprising a cover that covers the motor, wherein the wiring-body passage opens in the second surface at a position covered by the cover.

5. The tool drive device according to claim 1, wherein the movable part supports the tool at a position where a center of gravity of the tool is located on the opposite side from the motor with a central axis of the flange sandwiched therebetween.

6. A robot comprising the tool drive device according to claim 1.

* * * * *